(12) United States Patent
Jokisch et al.

(10) Patent No.: US 9,375,904 B2
(45) Date of Patent: Jun. 28, 2016

(54) MULTI-LAYER COMPOSITE MATERIALS COMPRISING A CELLULOSE-CONTAINING LAYER, CORRESPONDING METHOD OF PRODUCTION AND USE THEREOF

(75) Inventors: Carl Jokisch, Mannheim (DE); Juergen Weiser, Schriesheim (DE)

(73) Assignee: BASF SE, Ludwigshafen (DE)

( * ) Notice: Subject to any disclaimer, the term of this patent is extended or adjusted under 35 U.S.C. 154(b) by 877 days.

(21) Appl. No.: 12/867,994

(22) PCT Filed: Feb. 23, 2009

(86) PCT No.: PCT/EP2009/052107
§ 371 (c)(1),
(2), (4) Date: Aug. 17, 2010

(87) PCT Pub. No.: WO2009/106499
PCT Pub. Date: Sep. 3, 2009

(65) Prior Publication Data
US 2010/0316834 A1 Dec. 16, 2010

(30) Foreign Application Priority Data

Feb. 27, 2008 (EP) .................... 08102074

(51) Int. Cl.
*D06N 3/00* (2006.01)
*B32B 27/40* (2006.01)
*D06N 3/02* (2006.01)
(Continued)

(52) U.S. Cl.
CPC ................ *B32B 27/40* (2013.01); *B32B 3/266* (2013.01); *B32B 5/022* (2013.01); *B32B 5/26* (2013.01); *B32B 7/14* (2013.01); *B32B 21/02* (2013.01); *B32B 21/06* (2013.01); *B32B 21/08* (2013.01); *B32B 21/10* (2013.01); *B32B 21/14* (2013.01); *B32B 27/08* (2013.01); *B32B 27/10* (2013.01); *B32B 27/12* (2013.01); *B32B 27/18* (2013.01); *B32B 27/20* (2013.01); *B32B 27/304* (2013.01); *B32B 27/306* (2013.01); *B32B 27/308* (2013.01); *B32B 27/32* (2013.01); *B32B 29/02* (2013.01); *D06N 3/00* (2013.01); *D06N 3/02* (2013.01); *D06N 3/08* (2013.01); *B32B 2260/021* (2013.01); *B32B 2260/046* (2013.01); *B32B 2262/0253* (2013.01); *B32B 2262/0292* (2013.01); *B32B 2262/062* (2013.01); *B32B 2262/065* (2013.01); *B32B 2262/067* (2013.01); *B32B 2264/0242* (2013.01); *B32B 2266/06* (2013.01); *B32B 2270/00* (2013.01); *B32B 2272/00* (2013.01); *B32B 2307/40* (2013.01); *B32B 2307/50* (2013.01); *B32B 2307/724* (2013.01); *B32B 2439/40* (2013.01); *B32B 2451/00* (2013.01); *B32B 2479/00* (2013.01); *B32B 2553/00* (2013.01); *B32B 2605/003* (2013.01); *Y10T 428/2395* (2015.04); *Y10T 428/24802* (2015.01); *Y10T 428/24826* (2015.01); *Y10T 428/249981* (2015.04); *Y10T 428/249982* (2015.04); *Y10T 428/249985* (2015.04); *Y10T 428/249987* (2015.04); *Y10T 428/249991* (2015.04)

(58) Field of Classification Search
CPC ...... B32B 27/40; B32B 27/12; B32B 27/308; B32B 27/306; B32B 21/14; B32B 7/14; B32B 21/10; B32B 5/022; B32B 27/18; B32B 27/304; B32B 27/08; B32B 27/20; B32B 27/32; B32B 5/26; B32B 21/02; B32B 29/02; B32B 21/06; B32B 21/08; B32B 3/266; B32B 27/10; B32B 2553/00; B32B 2307/50; B32B 2451/00; B32B 2262/0292; B32B 2260/021; B32B 2262/067; B32B 2270/00; B32B 2605/003; B32B 2260/046; B32B 2264/0242; B32B 2307/40; B32B 2262/065; B32B 2479/00; B32B 2262/062; D06N 3/08; D06N 3/00; D06N 3/02; Y10T 428/249985; Y10T 428/249982; Y10T 428/249987; Y10T 428/2395; Y10T 428/249981; Y10T 428/249991; Y10T 428/24826; Y10T 428/24802
USPC .......................................................... 428/131
See application file for complete search history.

(56) References Cited

U.S. PATENT DOCUMENTS 3,155,560 A * 11/1964 Onstad et al. ............... 156/222
3,918,499 A * 11/1975 Higbee ......................... 138/125
(Continued)

FOREIGN PATENT DOCUMENTS

CN       101108669       1/2008
DE    10 2004 002 525    8/2005
(Continued)

OTHER PUBLICATIONS

"Complete Textile Glossary," 2001, Month Unknown, Celanese Acetate LLC, pp. 88, 158.*
(Continued)

*Primary Examiner* — Nicholas Kokkinos
(74) *Attorney, Agent, or Firm* — Oblon, McClelland, Maier & Neustadt, L.L.P.

(57) ABSTRACT

Multi-layer composite materials comprising a layer of cellulosic material, optionally at least one bonding layer and a polyurethane layer with capillaries passing through the entire thickness of the polyurethane layer; a corresponding method of production; and use thereof such as in packaging and decorative materials. An object of the multi-layer composite materials is the processing of cellulosic substrates such that they have an appealing visual appearance and pleasant haptics and are impervious to fingerprints, sweat marks and moisture.

27 Claims, No Drawings

(51) Int. Cl.
  *D06N 3/08* (2006.01)
  *B32B 3/26* (2006.01)
  *B32B 21/08* (2006.01)
  *B32B 27/10* (2006.01)
  *B32B 5/02* (2006.01)
  *B32B 5/26* (2006.01)
  *B32B 7/14* (2006.01)
  *B32B 21/02* (2006.01)
  *B32B 21/06* (2006.01)
  *B32B 21/10* (2006.01)
  *B32B 21/14* (2006.01)
  *B32B 27/08* (2006.01)
  *B32B 27/12* (2006.01)
  *B32B 27/18* (2006.01)
  *B32B 27/20* (2006.01)
  *B32B 27/30* (2006.01)
  *B32B 27/32* (2006.01)
  *B32B 29/02* (2006.01)

(56) References Cited

U.S. PATENT DOCUMENTS

| | | | |
|---|---|---|---|
| 4,099,943 A | 7/1978 | Fischman et al. | |
| 4,107,369 A * | 8/1978 | Gardner | 442/192 |
| 4,271,217 A | 6/1981 | Tanaka et al. | |
| 4,289,513 A * | 9/1981 | Brownhill et al. | 96/135 |
| 5,177,141 A | 1/1993 | Thoma et al. | |
| 5,597,645 A * | 1/1997 | Pike et al. | 96/99 |
| 5,817,415 A * | 10/1998 | Chou et al. | 428/359 |
| 6,372,333 B1 * | 4/2002 | Sugiyama et al. | 428/311.71 |
| 2005/0123770 A1 | 6/2005 | Kawazu et al. | |
| 2005/0182188 A1 | 8/2005 | Rische et al. | |
| 2006/0230731 A1 * | 10/2006 | Kalayci et al. | 55/486 |
| 2008/0224356 A1 | 9/2008 | Taeger et al. | |
| 2009/0048378 A1 | 2/2009 | Kawazu et al. | |
| 2009/0117794 A1 * | 5/2009 | Cheng et al. | 442/77 |
| 2010/0092726 A1 | 4/2010 | Schuette et al. | |
| 2010/0119775 A1 | 5/2010 | Bustos et al. | |

FOREIGN PATENT DOCUMENTS

| | | |
|---|---|---|
| EP | 0 084 851 | 8/1983 |
| EP | 0 365 902 | 5/1990 |
| EP | 0 738 747 | 10/1996 |
| EP | 1 529 822 | 5/2005 |
| EP | 1 882 610 A2 | 1/2008 |
| EP | 1 970 418 | 9/2008 |
| GB | 2 020 301 | 11/1979 |
| WO | 2007 072830 | 6/2007 |

OTHER PUBLICATIONS

"Arcuate," accessed Jul. 30, 2013, Dictionary.com, LLC, http://dictionary.reference.com/browse/arcuate.*
U.S. Appl. No. 13/054,378, filed Jan. 14, 2011, Jokisch, et al.
International Search Report issued Apr. 20, 2009 in PCT/EP09/052107 filed Feb. 23, 2009.
U.S. Appl. No. 12/867,916, filed Aug. 17, 2010, Jokisch, et al.
U.S. Appl. No. 12/919,022, filed Aug. 24, 2010, Jokisch et al.
U.S. Appl. No. 12/867,855, filed Aug. 16, 2010, Jokisch, et al.
U.S. Appl. No. 12/867,992, filed Aug. 17, 2010, Jokisch, et al.
U.S. Appl. No. 13/123,782, filed Apr. 12, 2011, Jokisch, et al.

* cited by examiner

MULTI-LAYER COMPOSITE MATERIALS COMPRISING A CELLULOSE-CONTAINING LAYER, CORRESPONDING METHOD OF PRODUCTION AND USE THEREOF

CROSS-REFERENCE TO RELATED APPLICATIONS

This application is a National Stage of PCT/EP2009/052107 filed on Feb. 23, 2009. This application is based upon and claims the benefit of priority to European Application No. 08102074.5 filed on Feb. 27, 2008.

Multi-layer composite materials comprising a cellulose-containing layer, corresponding method of production and use thereof The present invention relates to multilayered composite materials comprising as components:
(A) a layer of cellulosic material,
(B) optionally at least one bonding layer and
(C) a polyurethane layer with capillaries passing through the entire thickness of the polyurethane layer.

The present invention further relates to a process for producing the multilayered composite materials of the present invention and their use.

Paper, paperboard and wood are used in high-value applications as well as simple applications such as newsprint, cartons and simple seating furniture. High-value applications include expensively produced brochures and catalogs, expensive packaging and furniture. True, many such articles initially have an appealing appearance, but it changes to the worse after a short period of use. Fingerprints, sweat marks, difficult-to-remove stains and moisture can quickly give the corresponding cellulosic substrates an unattractive appearance.

There have been frequent attempts to avoid these disadvantages by applying coats of lacquer. However, such coats of lacquer are generally only suitable for those applications where the corresponding cellulosic materials are expected to have a glossy or shiny appearance. A delustered coat is in many cases not possible. Moreover, shiny coats of lacquer are particularly sensitive to soiling such as fingerprints.

It is an object of the present invention to process cellulosic substrates such that they have an appealing visual appearance and pleasant haptics and are impervious to fingerprints, sweat marks and moisture.

We have found that this object is achieved by the multilayered composite materials defined at the beginning. They comprise as components:
(A) a layer of cellulosic material,
(B) optionally at least one bonding layer, and
(C) a polyurethane layer with capillaries passing through the entire thickness of the polyurethane layer.

The layer of cellulosic material (A), herein also referred to in brief as cellulosic material (A), may comprise various kinds of cellulosic materials. Cellulose herein also comprehends hemicellulose and lignocellulose.

Cellulosic material (A) may be for example paperboard, cardboard or paper. Paper for the purposes of the present application can be uncoated or preferably coated or conventionally finished. More particularly, paper may comprise bleached paper. Paper may comprise one or more pigments, for example chalk, kaolin or $TiO_2$, and paper, paperboard or cardboard may be undyed (ecru in color) or colored. Paper, paperboard and cardboard for the purposes of the present applications may be printed or unprinted.

In one embodiment of the present invention, paper comprises kraft paper.

In another embodiment of the present invention, paper may comprise paper finished with polyacrylate dispersion.

In another embodiment of the present invention, cellulosic material (A) may comprise wood or chipboard. Wood may comprise for example lacquered or unlacquered wood, and wood for the purposes of the present invention may have been rendered biocidal. Veneer also counts as wood for the purposes of the present invention.

In one embodiment of the present invention, cellulosic material (A) may comprise wood plastic composite (WPC).

The natural fibers included in wood plastic composite are preferably cellulose fibers or lignocellulosic fibers. Examples are fibers of flax, sisal, hemp, coir, of abaca (so-called Manila hemp), but also rice spelt, bamboo, straw and peanut shells. Wood fibers are preferred examples of cellulose fibers. Wood fibers may comprise fibers of virgin wood or of reclaimed wood. Wood fibers may further comprise fibers from different wood species such as softwoods from, for example, spruce trees, fir trees, pine trees or larch trees or hardwoods from, for example, beech trees and oak trees. Wastewood such as for example shavings, chips or sawdust are also suitable. The wood fiber composition can vary in its constituents such as cellulose, hemicellulose and lignin.

The plastic in a wood plastic composite comprises in particular thermoplastics, which can be new or recycled from post-use thermoplastic polymers. Plastic for wood plastic composite is preferably selected from polyolefins, preferably polyethylene, in particular HDPE, polypropylene, in particular isotactic polypropylene, and polyvinyl chloride PVC), in particular unplasticized PVC, also polyvinyl acetate and mixtures of polyethylene and polypropylene.

Wood plastic composite can be processed by extrusion for example.

The layer thickness of layer of cellulosic material (A) can vary within wide limits, depending on the identity of the cellulosic material (A). The thickness of paper layers for example can vary in the range from 50 to 150 µm and in particular from 80 to 120 µm. Paperboard and cardboard may comprise a plurality of layers of paper and have a thickness in the range from 0.1 mm to 5 cm and preferably in the range from 1 mm to 1 cm.

Wood, chipboard and wood plastic composite can be from 0.5 mm to 10 cm in thickness, which shall apply only to the actual wood layer in the case of veneer.

Multilayered composite material of the present invention further comprises at least one polyurethane layer (C) with capillaries extending through the entire thickness of the polyurethane layer. Polyurethane layer (C) with capillaries extending through the entire thickness of the polyurethane layer is herein also referred to in brief as polyurethane layer (C).

In an embodiment of the present invention, polyurethane layer (C) has an average thickness in the range from 15 to 300 µm, preferably in the range from 20 to 150 µm and more preferably in the range from 25 to 80 µm.

In a preferred embodiment of the present invention, polyurethane layer (C) has capillaries which extend through the entire thickness (cross section) of the polyurethane layer (C).

In an embodiment of the present invention, polyurethane layer (C) has on average at least 100 and preferably at least 250 capillaries per 100 $cm^2$.

In an embodiment of the present invention, the capillaries have an average diameter in the range from 0.005 to 0.05 mm and preferably in the range from 0.009 to 0.03 mm.

In an embodiment of the present invention, the capillaries are uniformly distributed over polyurethane layer (C). In a preferred embodiment of the present invention, however, the capillaries are nonuniformly distributed over the polyurethane layer (C).

In an embodiment of the present invention, the capillaries are essentially arcuate. In another embodiment of the present invention, the capillaries have an essentially straight-line course.

The capillaries endow the polyurethane layer (C) with an air and water vapor permeability without any need for perforation. In an embodiment of the present invention, the water vapor permeability of the polyurethane layer (C) can be above 1.5 mg/cm$^2$·h, measured according to German standard specification DIN 53333. It is thus possible for moisture such as sweat for example to migrate through the polyurethane layer (C).

In an embodiment of the present invention, polyurethane layer (C) as well as capillaries has pores which do not extend through the entire thickness of the polyurethane layer (C).

In one embodiment, polyurethane layer (C) exhibits patterning. The patterning is freely choosable and can reproduce for example the patterning of a leather or of a wood surface. In an embodiment of the present invention, the patterning may reproduce a nubuck leather.

In an embodiment of the present invention, polyurethane layer (C) has a velvetlike appearance.

In an embodiment of the present invention, the patterning can correspond to a velvet surface, for example with small hairs having an average length in the range from 20 to 500 µm, preferably in the range from 30 to 200 µm and more preferably in the range from 60 to 100 µm. The small hairs can have for example a circle-shaped diameter. In a particular embodiment of the present invention, the small hairs have a cone-shaped form.

In an embodiment of the present invention, polyurethane layer (C) has small hairs with an average spacing of 50 to 350, preferably 100 to 250 µm from one hair to the next.

When the polyurethane layer (C) has small hairs, the statements about the average thickness apply to the polyurethane layer (C) without the small hairs.

The polyurethane layer (C) is preferably bonded to cellulosic material (A) via at least one bonding layer (B).

Bonding layer (B) may comprise an interrupted, i.e., discontinuous, layer, preferably of a cured organic adhesive.

In an embodiment of the present invention, bonding layer (B) comprises a layer applied in point form, stripe form or lattice form, for example in the form of diamonds, rectangles, squares or a honeycomb structure. In that case, polyurethane layer (C) comes into contact with cellulosic material (A) in the gaps of the bonding layer (B).

In another embodiment of the present invention, bonding layer (B) comprises a continuous layer.

In an embodiment of the present invention, bonding layer (B) comprises a layer of a cured organic adhesive, for example based on polyvinyl acetate, polyacrylate or in particular polyurethane, preferably based on polyurethanes having a glass transition temperature below 0° C.

The organic adhesive may for example be cured thermally, through actinic radiation or by aging.

In another embodiment of the present invention, bonding layer (B) comprises an adhesive gauze.

In an embodiment of the present invention, the bonding layer (B) has a maximum thickness of 100 µm, preferably 50 µm, more preferably 30 µm, most preferably 15 µm.

In an embodiment of the present invention, bonding layer (B) may comprise microballoons. Microballoons herein are spherical particles having an average diameter in the range from 5 to 20 µm and composed of polymeric material, in particular of halogenated polymer such as for example polyvinyl chloride or polyvinylidene chloride or copolymer of vinyl chloride with vinylidene chloride. Microballoons may be empty or preferably filled with a substance whose boiling point is slightly lower than room temperature, for example with n-butane and in particular with isobutane.

In an embodiment of the present invention, polyurethane layer (C) may be bonded to cellulosic material (A) via at least two bonding layers (B) having the same or a different composition. One bonding layer (B) may comprise a pigment with the other bonding layer (B) being pigment free.

In one variant, one bonding layer (B) may comprise microballoons with the other bonding layer (B) not comprising microballoons.

In an embodiment of the present invention, multilayered composite material of the present invention can have no further layers. In another embodiment of the present invention, multilayered composite material of the present invention may comprise at least one interlayer (D) disposed between cellulosic material (A) and bonding layer (B), between bonding layer (B) and polyurethane layer (C) or between two bonding layers (B), which may be the same or different. Interlayer (D) is selected from textile, paper, batt materials, and batt materials (nonwovens) of synthetic materials such as polypropylene or polyurethane, in particular nonwovens of thermoplastic polyurethane.

In the embodiments where multilayered composite material of the present invention comprises at least one interlayer (D), polyurethane layer (C) will preferably come into direct contact not with cellulosic material (A), but with interlayer (D).

In an embodiment of the present invention, interlayer (D) may have an average diameter (thickness) in the range from 0.05 mm to 5 cm, preferably in the range from 0.1 mm to 0.5 cm and more preferably in the range from 0.2 mm to 2 mm.

Preferably, interlayer (D) has a water vapor permeability in the range of greater than 1.5 mg/cm$^2$·h, measured according to German standard specification DIN 53333.

Multilayered composite materials of the present invention have a high mechanical strength and fastnesses. They further have a high water vapor permeability. Drops of spilt liquid are easy to remove, for example with a cloth. Multilayered composite materials of the present invention also have an attractive appearance and a very pleasant soft hand.

The use of multilayered composite material of the present invention is for example advantageous in the interiors of vehicles, for example in roof liners, dashboards, interior trim and center consoles. It is further advantageous to use multilayered composite materials of the present invention for packaging materials, for example for ornamental and decorative packaging, and also for decorative materials.

In one embodiment of the present invention, multilayered composite materials of the present invention are advantageously used in expensive printed products such as brochures, prospectuses, catalogs, in particular in annual reports and in books, for example in book covers.

Multilayered composite materials of the present invention can further be used with advantage in interior architecture, for example for covering furniture.

The present invention further provides a process for producing multilayered composite materials of the present invention, herein also referred to as inventive production process. An embodiment of the inventive production process proceeds by forming a polyurethane layer (C) with the aid of a mold, applying at least one organic adhesive uniformly or partially onto cellulosic material (A) and/or onto polyurethane layer (C) and then bonding polyurethane layer (C) pointwise, stripwise or areawise to cellulosic material (A).

In an embodiment of the present invention, multilayered composite material of the present invention is produced by a coating process by first providing a polyurethane film (C), coating at least a cellulosic material (A) or the polyurethane film (C) or both with organic adhesive on one face in each case, partially, for example in the form of a pattern, and then bringing the two faces into contact with each other. Thereafter, the system thus obtainable can additionally be pressed together or thermally treated or pressed together while being heated.

The polyurethane film (C) forms the later polyurethane layer (C) of the multilayered composite material of the present invention. The polyurethane film (C) can be produced as follows:

An aqueous polyurethane dispersion is applied to a mold, which is preheated, the water is allowed to evaporate and then the resulting polyurethane film (C) is transferred to cellulosic material (A).

Aqueous polyurethane dispersion can be applied to the mold by conventional methods, in particular by spraying, for example with a spray gun.

The mold may exhibit patterning, also referred to as structuring, for example produced by laser engraving or by molding with a negative mold.

An embodiment of the present invention comprises providing a mold having an elastomeric layer or a layer composite, comprising an elastomeric layer on a support, the elastomeric layer comprising a binder and also if appropriate further, additive and auxiliary materials. Providing a mold can then comprise the following steps:
1) applying a liquid binder, comprising additive and/or auxiliary materials if appropriate, to a patterned surface, for example another mold or an original pattern,
2) curing the binder, for example by thermal curing, radiative curing or by allowing to age,
3) separating the mold thus obtainable and if appropriate applying it to a support, for example a metal plate or a metal cylinder.

An embodiment of the present invention proceeds by a liquid silicone being applied to a pattern, the silicone being allowed to age and thus cure and then stripping. The silicone film is then adhered to an aluminum support.

A preferred embodiment of the present invention provides a mold comprising a laser-engravable layer or a layer composite comprising a laser-engravable layer on a support, the laser-engravable layer comprising a binder and also, if appropriate, further, additive and auxiliary materials. The laser-engravable layer is preferably also elastomeric.

In a preferred embodiment, the providing of a mold comprises the steps of:
1) providing a laser-engravable layer or a layer composite comprising a laser-engravable layer on a support, the laser-engravable layer comprising a binder and also, preferably, additive and auxiliary materials,
2) thermochemical, photochemical or actinic amplification of the laser-engravable layer,
3) engraving into the laser-engravable layer, using a laser, a surface structure corresponding to the surface structure of the surface-structured coating.

The laser-engravable layer, which is preferably elastomeric, or the layer composite can be and preferably are present on a support. Examples of suitable supports comprise woven fabrics and self-supporting films/sheets of polyethylene terephthalate (PET), polyethylene naphthalate (PEN), polybutylene terephthalate (PBT), polyethylene, polypropylene, polyamide or polycarbonate, preferably PET or PEN self-supporting films/sheets.

Useful supports likewise include papers and knits, for example of cellulose. As supports there may also be used conical or cylindrical sleeves of the materials mentioned. Also suitable for sleeves are glass fiber fabrics or composite materials comprising glass fibers and polymeric materials of construction. Suitable support materials further include metallic supports such as for example solid or fabric-shaped, sheetlike or cylindrical supports of aluminum, steel, magnetizable spring steel or other iron alloys.

In an embodiment of the present invention, the support may be coated with an adhesion-promoting layer to provide better adhesion of the laser-engravable layer. Another embodiment of the present invention requires no adhesion-promoting layer.

The laser-engravable layer comprises at least one binder, which may be a prepolymer which reacts in the course of a thermochemical amplification to form a polymer. Suitable binders can be selected according to the properties desired for the laser-engravable layer or the mold, for example with regard to hardness, elasticity or flexibility. Suitable binders can essentially be divided into 3 groups, without there being any intention to limit the binders thereto.

The first group comprises those binders which have ethylenically unsaturated groups. Ethylenically unsaturated groups are crosslinkable photochemically, thermochemically, by means of electron beams or by means of any desired combination thereof. In addition, mechanical amplification is possible by means of fillers. Such binders are for example those comprising 1,3-diene monomers such as isoprene or 1,3-butadiene in polymerized form. The ethylenically unsaturated group may either function as a chain building block of the polymer (1,4-incorporation), or it may be bonded to the polymer chain as a side group (1,2-incorporation). As examples there may be mentioned natural rubber, polybutadiene, polyisoprene, styrene-butadiene rubber, nitrile-butadiene rubber, acrylonitrile-butadiene-styrene (ABS) copolymer, butyl rubber, styrene-isoprene rubber, polychloroprene, polynorbornene rubber, ethylene-propylene-diene monomer (EPDM) rubber or polyurethane elastomers having ethylenically unsaturated groups.

Further examples comprise thermoplastic elastomeric block copolymers of alkenyl-aromatics and 1,3-dienes. The block copolymers may comprise either linear block copolymers or else radical block copolymers. Typically they are three-block copolymers of the A-B-A type, but they may also comprise two-block polymers of the A-B type, or those having a plurality of alternating elastomeric and thermoplastic blocks, for example A-B-A-B-A. Mixtures of two or more different block copolymers can also be used. Commercially available three-block copolymers frequently comprise certain proportions of two-block copolymers. Diene units may be 1,2- or 1,4-linked. Block copolymers of the styrene-butadiene type and also of the styrene-isoprene type can be used. They are commercially available under the name Kraton® for example. It is also possible to use thermoplastic elastomeric block copolymers having end blocks of styrene and a random styrene-butadiene middle block, which are available under the name Styroflex®.

Further examples of binders having ethylenically unsaturated groups comprise modified binders in which crosslinkable groups are introduced into the polymeric molecule through grafting reactions.

The second group comprises those binders which have functional groups. The functional groups are crosslinkable thermochemically, by means of electron beams, photochemically or by means of any desired combination thereof. In addition, mechanical amplification is possible by means of fillers. Examples of suitable functional groups comprise —Si(HR$^1$)O—, —Si(R$^1$R$^2$)O—, —OH, —NH$_2$, —NHR$^1$, —COOH, —COOR$^1$, —COHN$_2$, —O—C(O)NHR$^1$, —SO$_3$H or —CO—. Examples of binders comprise silicone elastomers, acrylate rubbers, ethylene-acrylate rubbers, ethylene-acrylic acid rubbers or ethylene-vinyl acetate rubbers and also their partially hydrolyzed derivatives, thermoplastic elastomeric polyurethanes, sulfonated polyethylenes or thermoplastic elastomeric polyesters. In the formulae, R$^1$ and—if present—R$^2$ are different or preferably the same and are each selected from organic groups and in particular C$_1$-C$_6$-alkyl.

An embodiment of the present invention comprises using binders having both ethylenically unsaturated groups and functional groups. Examples comprise addition—crosslinking silicone elastomers having functional groups and ethylenically unsaturated groups, copolymers of butadiene with (meth)acrylates, (meth)acrylic acid or acrylonitrile, and also copolymers or block copolymers of butadiene or isoprene with styrene derivatives having functional groups, examples being block copolymers of butadiene and 4-hydroxystyrene.

The third group of binders comprises those which have neither ethylenically unsaturated groups nor functional groups. There may be mentioned for example polyolefins or ethylene-propylene elastomers or products obtained by hydrogenation of diene units, for example SEBS rubbers.

Polymer layers comprising binders without ethylenically unsaturated or functional groups generally have to be amplified mechanically, with the aid of high-energy radiation or a combination thereof in order to permit optimum crisp structurability via laser.

It is also possible to use mixtures of two or more binders, in which case the two or more binders in any one mixture may all just come from one of the groups described or may come from two or all three groups. The possible combinations are only limited insofar as the suitability of the polymer layer for the laser-structuring operation and the negative-molding operation must not be adversely affected. It may be advantageous to use for example a mixture of at least one elastomeric binder having no functional groups with at least one further binder having functional groups or ethylenically unsaturated groups.

In an embodiment of the present invention, the proportion of binder or binders in the elastomeric layer or the particular laser-engravable layer is in the range from 30% by weight to 99% by weight based on the sum total of all the constituents of the particular elastomeric layer or the particular laser-engravable layer, preferably in the range from 40% to 95% by weight and most preferably in the range from 50% to 90% by weight.

In an embodiment of the present invention, polyurethane layer (C) is formed with the aid of a silicone mold. Silicone molds herein are molds prepared using at least one binder having at least one and preferably at least three O—Si(R$^1$R$^2$)—O— groups per molecule, where the variables are each as defined above.

Optionally, the elastomeric layer or laser-engravable layer may comprise reactive low molecular weight or oligomeric compounds. Oligomeric compounds generally have a molecular weight of not more than 20 000 g/mol. Reactive low molecular weight and oligomeric compounds are hereinbelow simply referred to as monomers.

Monomers may be added to increase the rate of photochemical or thermochemical crosslinking or of crosslinking via high-energy radiation, if desired. When binders from the first and second groups are used, the addition of monomers for acceleration is generally not absolutely essential. In the case of binders from the third group, the addition of monomers is generally advisable without being absolutely essential in every case.

Irrespective of the issue of crosslinking rate, monomers can also be used for controlling crosslink density. Depending on the identity and amount of low molecular weight compounds added, wider or narrower networks are obtained. Known ethylenically unsaturated monomers can be used first of all. The monomers should be substantially compatible with the binders and have at least one photochemically or thermochemically reactive group. They should not be volatile. Preferably, the boiling point of suitable monomers is at least 150° C. Of particular suitability are amides of acrylic acid or methacrylic acid with mono- or polyfunctional alcohols, amines, aminoalcohols or hydroxy ethers and hydroxy esters, styrene or substituted styrenes, esters of fumaric or maleic acid, or allyl compounds. Examples comprise n-butyl acrylate, 2-ethylhexyl acrylate, lauryl acrylate, 1,4-butanediol di(meth)acrylate, 1,6-hexanediol diacrylate, 1,6-hexanediol dimethacrylate, 1,9-nonanediol diacrylate, trimethylolpropane trimethacrylate, trimethylolpropane triacrylate, dipropylene glycol diacrylate, tripropylene glycol diacrylate, dioctyl fumarate, N-dodecylmaleimide and triallyl isocyanurate.

Monomers suitable for thermochemical amplification in particular comprise reactive low molecular weight silicones such as for example cyclic siloxanes, Si—H-functional siloxanes, siloxanes having alkoxy or ester groups, sulfur-containing siloxanes and silanes, dialcohols such as for example 1,4-butanediol, 1,6-hexanediol, 1,8-octanediol, 1,9-nonanediol, diamines such as for example 1,6-hexanediamine, 1,8-octanediamine, aminoalcohols such as for example ethanolamine, diethanolamine, butylethanolamine, dicarboxylic acids such as for example 1,6-hexanedicarboxylic acid, terephthalic acid, maleic acid or fumaric acid.

It is also possible to use monomers having both ethylenically unsaturated groups and functional groups. As examples there may be mentioned ω-hydroxyalkyl (meth)acrylates, such as for example ethylene glycol mono(meth)acrylate, 1,4-butanediol mono(meth)acrylate or 1,6-hexanediol mono(meth)acrylate.

It is of course also possible to use mixtures of different monomers, provided that the properties of the elastomeric layer are not adversely affected by the mixture. In general, the amount of added monomers is in the range from 0% to 40% by weight, based on the amount of all the constituents of the elastomeric layer or of the particular laser-engravable layer, preferably in the range from 1% to 20% by weight.

In one embodiment, one or more monomers may be used together with one or more catalysts. It is thus possible to accelerate silicone molds by addition of one or more acids or via organotin compounds to accelerate step 2) of the providing of the mold.

Suitable organotin compounds can be: di-n-butyltin dilaurate, di-n-butyltin dioctanoate, di-n-butyltin di-2-ethylhexanoate, di-n-octyltin di-2-ethylhexanoate and di-n-butylbis-(1-oxoneodecyloxy)stannane.

The elastomeric layer or the laser-engravable layer may further comprise additive and auxiliary materials such as for example IR absorbers, dyes, dispersants, antistats, plasticizers or abrasive particles. The amount of such additive and auxiliary materials should generally not exceed 30% by weight, based on the amount of all the components of the elastomeric layer or of the particular laser-engravable layer.

The elastomeric layer or the laser-engravable layer may be constructed from a plurality of individual layers. These individual layers may be of the same material composition, of substantially the same material composition or of differing material composition. The thickness of the laser-engravable layer or of all individual layers together is generally between 0.1 and 10 mm and preferably in the range from 0.5 to 3 mm. The thickness can be suitably chosen depending on use-related and machine-related processing parameters of the laser-engraving operation and of the negative molding operation.

The elastomeric layer or the laser-engravable layer may optionally further comprise a top layer having a thickness of not more than 300 µm. The composition of such a top layer is chooseable with regard to optimum engravability and mechanical stability, while the composition of the layer underneath is chosen with regard to optimum hardness or elasticity.

In an embodiment of the present invention, the top layer itself is laser-engravable or removable in the course of the laser-engraving operation together with the layer underneath. The top layer comprises at least one binder. It may further comprise an absorber for laser radiation or else monomers or auxiliaries.

In an embodiment of the present invention, the silicone mold comprises a silicone mold structured with the aid of laser engraving.

It is very particularly advantageous for the process according to the present invention to utilize thermoplastic elastomeric binders or silicone elastomers. When thermoplastic elastomeric binders are used, production is preferably effected by extrusion between a support film/sheet and a cover film/sheet or a cover element followed by calendering, as disclosed in EP-A 0 084 851 for flexographic printing elements for example. Even comparatively thick layers can be produced in a single operation in this way. Multilayered elements can be produced by coextrusion.

To structure the mold with the aid of laser engraving, it is preferable to amplify the laser-engravable layer before the laser-engraving operation by heating (thermochemically), by exposure to UV light (photochemically) or by exposure to high-energy radiation (actinically) or any desired combination thereof.

Thereafter, the laser-engravable layer or the layer composite is applied to a cylindrical (temporary) support, for example of plastic, glass fiber-reinforced plastic, metal or foam, for example by means of adhesive tape, reduced pressure, clamping devices or magnetic force, and engraved as described above. Alternatively, the planar layer or the layer composite can also be engraved as described above. Optionally, the laser-engravable layer is washed using a rotary cylindrical washer or a continuous washer with a cleaning agent for removing engraving residues during the laser-engraving operation.

The mold can be produced in the manner described as a negative mold or as a positive mold.

In a first variant, the mold has a negative structure, so that the coating which is bondable to cellulosic material (A) is obtainable directly by application of a liquid plastics material to the surface of the mold and subsequent solidification of the polyurethane.

In a second variant, the mold has a positive structure, so that initially a negative mold is produced from the laser-structured positive mold. The coating bondable to a sheetlike support can then be obtained from this negative mold by application of a liquid plastics material to the surface of the negative mold and subsequent solidification of the plastics material.

Preferably, structure elements having dimensions in the range from 10 to 500 µm are engraved into the mold. The structure elements may be in the form of elevations or depressions. Preferably, the structure elements have a simple geometric shape and are for example circles, ellipses, squares, rhombuses, triangles and stars. The structure elements may form a regular or irregular screen. Examples are a classic dot screen or a stochastic screen, for example a frequency-modulated screen.

In an embodiment of the present invention, the mold is structured using a laser to cut wells into the mold which have an average depth in the range from 50 to 250 µm and a center-to-center spacing in the range from 50 to 250 µm.

For example, the mold can be engraved such that it has wells having a diameter in the range from 10 to 500 µm at the surface of the mold. The diameter at the surface of the mold is preferably in the range from 20 to 250 µm and more preferably 30-150 µm. The spacing of the wells can be for example in the range from 10 to 500 µm, preferably in the range from 20 to 200 µm and more preferably up to 80 µm.

In an embodiment of the present invention, the mold preferably has a surface fine structure as well as a surface coarse structure. Both coarse structure and fine structure can be produced by laser engraving. The fine structure can be for example a microroughness having a roughness amplitude in the range from 1 to 30 µm and a roughness frequency in the range from 0.5 to 30 µm. The dimensions of the microroughness are preferably in the range from 1 to 20 µm, more preferably in the range from 2 to 15 µm and more preferably in the range from 3 to 10 µm.

IR lasers in particular are suitable for laser engraving. However, it is also possible to use lasers having shorter wavelengths, provided the laser is of sufficient intensity. For example, a frequency-doubled (532 nm) or frequency-tripled (355 nm) Nd-YAG laser can be used, or else an excimer laser (248 nm for example). The laser-engraving operation may utilize for example a $CO_2$ laser having a wavelength of 10 640 nm. It is particularly preferable to use lasers having a wavelength in the range from 600 to 2000 nm. Nd-YAG lasers (1064 nm), IR diode lasers or solid-state lasers can be used for example. Nd/YAG lasers are particularly preferred. The image information to be engraved is transferred directly from the lay-out computer system to the laser apparatus. The lasers can be operated either continuously or in a pulsed mode.

The mold obtained can generally be used directly as produced. If desired, the mold obtained can additionally be cleaned. Such a cleaning step removes loosened but possibly still not completely detached layer constituents from the surface. In general, simply treating with water, water/surfactant, alcohols or inert organic cleaning agents which are preferably low-swelling will be sufficient.

In a further step, an aqueous formulation of polyurethane is applied to the mold. The applying may preferably be effected by spraying. The mold should have been heated when the formulation of polyurethane is applied, for example to temperatures of at least 80° C., preferably at least 90° C. The water from the aqueous formulation of polyurethane evaporates and forms the capillaries in the solidifying polyurethane layer.

Aqueous in connection with the polyurethane dispersion is to be understood as meaning that the polyurethane dispersion comprises water, but less than 5% by weight, based on the dispersion, preferably less than 1% by weight of organic solvent. It is particularly preferable for there to be no detectable volatile organic solvent. Volatile organic solvents herein are such organic solvents as have a boiling point of up to 200° C. at standard pressure.

The aqueous polyurethane dispersion can have a solids content in the range from 5% to 60% by weight, preferably in the range from 10% to 50% by weight and more preferably in the range from 25% to 45% by weight.

Polyurethanes (PU) are common general knowledge, commercially available and consist in general of a soft phase of comparatively high molecular weight polyhydroxy compounds, for example of polycarbonate, polyester or polyether segments, and a urethane hard phase formed from low molecular weight chain extenders and di- or polyisocyanates.

Processes for preparing polyurethanes (PU) are common general knowledge. In general, polyurethanes (PU) are prepared by reaction of
(a) isocyanates, preferably diisocyanates, with
(b) isocyanate-reactive compounds, typically having a molecular weight ($M_w$) in the range from 500 to 10 000 g/mol, preferably in the range from 500 to 5000 g/mol and more preferably in the range from 800 to 3000 g/mol, and
(c) chain extenders having a molecular weight in the range from 50 to 499 g/mol if appropriate in the presence of
(d) catalysts
(e) and/or customary additive materials.

In what follows, the starting components and processes for preparing the preferred polyurethanes (PU) will be described by way of example. The components (a), (b), (c) and also if appropriate (d) and/or (e) customarily used in the preparation of polyurethanes (PU) will now be described by way of example:

As isocyanates (a) there may be used commonly known aliphatic, cycloaliphatic, araliphatic and/or aromatic isocyanates, examples being tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-tolylene diisocyanate (TDI), diphenylmethane diisocyanate, 3,3'-dimethylbiphenyl diisocyanate, 1,2-diphenylethane diisocyanate and/or phenylene diisocyanate. Preference is given to using 4,4'-MDI. Preference is also given to aliphatic diisocyanates, in particular hexamethylene diisocyanate (HDI), and particular preference is given to aromatic diisocyanates such as 2,2'-, 2,4'- and/or 4,4'-diphenylmethane diisocyanate (MDI) and mixtures of the aforementioned isomers.

As isocyanate-reactive compounds (b) there may be used the commonly known isocyanate-reactive compounds, examples being polyesterols, polyetherols and/or polycarbonate diols, which are customarily also subsumed under the term "polyols", having molecular weights ($M_w$) in the range of 500 and 8000 g/mol, preferably in the range from 600 to 6000 g/mol, in particular in the range from 800 to 3000 g/mol, and preferably an average functionality of 1.8 to 2.3, preferably 1.9 to 2.2, in particular 2, with regard to isocyanates. Preference is given to using polyether polyols, for example those based on commonly known starter substances and customary alkylene oxides, for example ethylene oxide, 1,2-propylene oxide and/or 1,2-butylene oxide, preferably polyetherols based on polyoxytetramethylene (poly-THF), 1,2-propylene oxide and ethylene oxide. Polyetherols have the advantage of having a higher hydrolysis stability than polyesterols, and are preferably used as component (b), in particular for preparing soft polyurethanes polyurethane (PU1).

As polycarbonate diols there may be mentioned in particular aliphatic polycarbonate diols, for example 1,4-butanediol polycarbonate and 1,6-hexanediol polycarbonate.

As polyester diols there are to be mentioned those obtainable by polycondensation of at least one primary diol, preferably at least one primary aliphatic diol, for example ethylene glycol, 1,4-butanediol, 1,6-hexanediol, neopentyl glycol or more preferably 1,4-dihydroxymethylcyclohexane (as isomer mixture) or mixtures of at least two of the aforementioned diols, and at least one, preferably at least two dicarboxylic acids or their anhydrides. Preferred dicarboxylic acids are aliphatic dicarboxylic acids such as adipic acid, glutaric acid, succinic acid and aromatic dicarboxylic acids such as for example phthalic acid and particularly isophthalic acid.

Polyetherols are preferably prepared by addition of alkylene oxides, in particular ethylene oxide, propylene oxide and mixtures thereof, onto diols such as for example ethylene glycol, 1,2-propylene glycol, 1,2-butylene glycol, 1,4-butanediol, 1,3-propanediol, or onto triols such as for example glycerol, in the presence of high-activity catalysts. Such high-activity catalysts are for example cesium hydroxide and dimetal cyanide catalysts, also known as DMC catalysts. Zinc hexacyanocobaltate is a frequently employed DMC catalyst. The DMC catalyst can be left in the polyetherol after the reaction, but preferably it is removed, for example by sedimentation or filtration.

Mixtures of various polyols can be used instead of just one polyol.

To improve dispersibility, isocyanate-reactive compounds (b) may also include a proportion of one or more diols or diamines having a carboxylic acid group or sulfonic acid group (b'), in particular alkali metal or ammonium salts of 1,1-dimethylolbutanoic acid, 1,1-dimethylolpropionic acid or

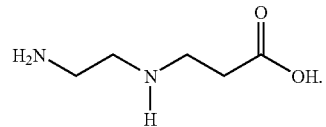

Useful chain extenders (c) include commonly known aliphatic, araliphatic, aromatic and/or cycloaliphatic compounds having a molecular weight in the range from 50 to 499 g/mol and at least two functional groups, preferably compounds having exactly two functional groups per molecule, examples being diamines and/or alkanediols having 2 to 10 carbon atoms in the alkylene radical, in particular 1,3-propanediol, 1,4-butanediol, 1,6-hexanediol and/or di-, tri-, tetra-, penta-, hexa-, hepta-, octa-, nona- and/or decaalkylene glycols having 3 to 8 carbon atoms per molecule, preferably the corresponding oligo- and/or polypropylene glycols, and mixtures of chain extenders (c) can also be used.

It is particularly preferable for components (a) to (c) to comprise difunctional compounds, i.e., diisocyanates (a), difunctional polyols, preferably polyetherols (b) and difunctional chain extenders, preferably diols.

Useful catalysts (d) to speed in particular the reaction between the NCO groups of the diisocyanates (a) and the hydroxyl groups of the building block components (b) and (c) are customary tertiary amines, for example triethylamine, dimethylcyclohexylamine, N-methylmorpholine, N,N'-dimethylpiperazine, 2-(dimethylaminoethoxy)ethanol, diazabicyclo-(2,2,2)octane (DABCO) and similar tertiary amines, and also in particular organic metal compounds such as titanic esters, iron compounds such as for example iron(III) acetylacetonate, tin compounds, for example tin diacetate, tin dioctoate, tin dilaurate or the tin dialkyl salts of aliphatic carboxylic acids such as dibutyltin diacetate, dibutyltin dilaurate or the like. The catalysts are typically used in amounts of 0.0001 to 0.1 part by weight per 100 parts by weight of component (b).

As well as catalyst (d), auxiliaries and/or additives (e) can also be added to the components (a) to (c). There may be mentioned for example blowing agents, antiblocking agents, surface-active substances, fillers, for example fillers based on nanoparticles, in particular fillers based on $CaCO_3$, nucleators, glidants, dyes and pigments, antioxidants, for example against hydrolysis, light, heat or discoloration, inorganic and/or organic fillers, reinforcing agents and plasticizers, metal deactivators. In a preferred embodiment, component (e) also includes hydrolysis stabilizers such as for example polymeric and low molecular carbodiimides. The soft polyurethane preferably comprises triazole and/or triazole derivative and antioxidants in an amount of 0.1% to 5% by weight based on the total weight of the soft polyurethane in question. Useful antioxidants are generally substances that inhibit or prevent unwanted oxidative processes in the plastics material to be protected. In general, antioxidants are commercially available. Examples of antioxidants are sterically hindered phenols, aromatic amines, thiosynergists, organophosphorus compounds of trivalent phosphorus and hindered amine light stabilizers. Examples of sterically hindered phenols are to be found in Plastics Additive Handbook, 5th edition, H. Zweifel, ed., Hanser Publishers, Munich, 2001 ([1]), pages 98-107 and page 116-page 121. Examples of aromatic amines are to be found in [1] pages 107-108. Examples of thiosynergists are given in [1], pages 104-105 and pages 112-113. Examples of phosphites are to be found in [1], pages 109-112. Examples of hindered amine light stabilizers are given in [1], pages 123-136. Phenolic antioxidants are preferred for use in the antioxidant mixture. In a preferred embodiment, the antioxidants, in particular the phenolic antioxidants, have a molar mass of greater than 350 g/mol, more preferably greater than 700 g/mol and a maximum molar mass ($M_w$) of not more than 10 000 g/mol, preferably up to not more than 3000 g/mol. They further preferably have a melting point of not more than 180° C. It is further preferable to use antioxidants that are amorphous or liquid. Mixtures of two or more antioxidants can likewise be used as component (e).

As well as the recited components (a), (b) and (c) and if appropriate (d) and (e), chain regulators (chain-terminating agents), customarily having a molecular weight of 31 to 3000 g/mol, can also be used. Such chain regulators are compounds which have only one isocyanate-reactive functional group, examples being monofunctional alcohols, monofunctional amines and/or monofunctional polyols. Such chain regulators make it possible to adjust flow behavior, in particular in the case of soft polyurethanes, to specific values. Chain regulators can generally be used in an amount of 0 to 5 parts and preferably 0.1 to 1 part by weight, based on 100 parts by weight of component (b), and by definition come within component (c).

As well as the specified components (a), (b) and (c) and if appropriate (d) and (e), it is also possible to use crosslinkers having two or more isocyanate-reactive groups toward the end of the polyurethane-forming reaction, for example hydrazine hydrate.

To adjust the hardness of polyurethane (PU), the components (b) and (c) can be chosen within relatively wide molar ratios. Useful are molar ratios of component (b) to total chain extenders (c) in the range from 10:1 to 1:10, and in particular in the range from 1:1 to 1:4, the hardness of the soft polyurethanes increasing with increasing (c) content. The reaction to produce polyurethane (PU) can be carried out at an index in the range from 0.8 to 1.4:1, preferably at an index in the range from 0.9 to 1.2:1 and more preferably at an index in the range from 1.05 to 1.2:1. The index is defined by the ratio of all the isocyanate groups of component (a) used in the reaction to the isocyanate-reactive groups, i.e., the active hydrogens, of components (b) and if appropriate (c) and if appropriate monofunctional isocyanate-reactive components as chain-terminating agents such as monoalcohols for example.

Polyurethane (PU) can be prepared by conventional processes in a continuous manner, for example by the one-shot or the prepolymer process, or batchwise by the conventional prepolymer operation. In these processes, the reactant components (a), (b), (c) and if appropriate (d) and/or (e) can be mixed in succession or simultaneously, and the reaction ensues immediately.

Polyurethane (PU) can be dispersed in water in a conventional manner, for example by dissolving polyurethane (PU) in acetone or preparing it as a solution in acetone, admixing the solution with water and then removing the acetone, for example distillatively. In one variant, polyurethane (PU) is prepared as a solution in N-methylpyrrolidone or N-ethylpyrrolidone, admixed with water and the N-methylpyrrolidone or N-ethylpyrrolidone is removed.

In an embodiment of the present invention, aqueous dispersions of the present invention comprise two different polyurethanes polyurethane (PU1) and polyurethane (PU2), of which polyurethane (PU1) is a so-called soft polyurethane which is constructed as described above for polyurethane (PU), and at least one hard polyurethane (PU2).

Hard polyurethane (PU2) can in principle be prepared similarly to soft polyurethane (PU1), but other isocyanate-reactive compounds (b) or other mixtures of isocyanate-reactive compounds (b), herein also referred to as isocyanate-reactive compounds (b2) or in short compound (b2), are used.

Examples of compounds (b2) are in particular 1,4-butanediol, 1,6-hexanediol and neopentyl glycol, either mixed with each other or mixed with polyethylene glycol.

In one version of the present invention, diisocyanate (a) and polyurethane (PU2) are each mixtures of diisocyanates, for example mixtures of HDI and IPDI, larger proportions of IPDI being chosen for the preparation of hard polyurethane (PU2) than for the preparation of soft polyurethane (PU1).

In an embodiment of the present invention, polyurethane (PU2) has a Shore A hardness in the range from above 60 to not more than 100, the Shore A hardness being determined in accordance with German standard specification DIN 53505 after 3 s.

In an embodiment of the present invention, polyurethane (PU) has an average particle diameter in the range from 100 to 300 nm and preferably in the range from 120 to 150 nm, determined by laser light scattering.

In an embodiment of the present invention, soft polyurethane (PU1) has an average particle diameter in the range from 100 to 300 nm and preferably in the range from 120 to 150 nm, determined by laser light scattering.

In an embodiment of the present invention, polyurethane (PU2) has an average particle diameter in the range from 100 to 300 nm and preferably in the range from 120 to 150 nm, determined by laser light scattering.

The aqueous polyurethane dispersion may further comprise at least one curative, which may also be referred to as a crosslinker. Compounds are useful as a curative which are capable of crosslinking a plurality of polyurethane molecules together, for example on thermal activation. Of particular suitability are crosslinkers based on trimeric diisocyanates, in particular based on aliphatic diisocyanates such as hexamethylene diisocyanate. Very particular preference is given to crosslinkers of formula I a or I b, herein also referred to in brief as compound (V)

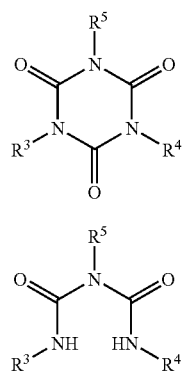

where $R^3$, $R^4$ and $R^5$ may be different or preferably the same and are each selected from $A^1$-NCO and $A^1$-NH—CO—X, where
$A^1$ is a spacer having 2 to 20 carbon atoms, selected from arylene, unsubstituted or substituted with one to four $C_1$-$C_4$-alkyl groups, alkylene and cycloalkylene, for example 1,4-cyclohexylene. Preferred spacers $A^1$ are phenylene, in particular para-phenylene, also tolylene, in particular para-tolylene, and $C_2$-$C_{12}$-alkylene such as for example ethylene ($CH_2CH_2$), also —$(CH_2)_3$—, —$(CH_2)_4$—, —$(CH_2)_5$—, —$(CH_2)_6$—, —$(CH_2)_8$—, —$(CH_2)_{10}$—, —$(CH_2)_{12}$—.
X is selected from $O(AO)_xR^6$, where
AO is $C_2$-$C_4$-alkylene oxide, for example butylene oxide, in particular ethylene oxide ($CH_2CH_2O$) and propylene oxide ($CH(CH_3)CH_2O$) or ($CH_2CH(CH_3)O$),
x is an integer from 1 to 50, preferably 5 to 25, and
$R^6$ is selected from hydrogen and $C_1$-$C_{30}$-alkyl, in particular $C_1$-$C_{10}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, more preferably $C_1$-$C_4$-alkyl such as methyl, ethyl, n-propyl, isopropyl, n-butyl, isobutyl, sec-butyl and tert-butyl.
Particularly preferred compounds (V) are those wherein $R^3$, $R^4$ and $R^5$ are each the same $(CH_2)_4$—NCO, $(CH_2)_6$—NCO or $(CH_2)_{12}$—NCO.

Aqueous polyurethane dispersions may comprise further constituents, for example (f) a silicone compound having reactive groups,
herein also referred to as silicone compound (f).

Examples of reactive groups in connection with silicone compounds (f) are for example carboxylic acid groups, carboxylic acid derivatives such as for example methyl carboxylate or carboxylic anhydrides, in particular succinic anhydride groups, and more preferably carboxylic acid groups.

Examples of reactive groups further include primary and secondary amino groups, for example NH(iso-$C_3H_7$) groups, NH(n-$C_3H_7$) groups, NH(cyclo-$C_6H_{11}$) groups and NH(n-$C_4H_9$) groups, in particular NH($C_2H_5$) groups and NH($CH_3$) groups, and most preferably $NH_2$ groups.

Preference is further given to aminoalkylamino groups such as for example —NH—$CH_2$—$CH_2$—$NH_2$ groups, —NH—$CH_2$—$CH_2$—$CH_2$—$NH_2$ groups, —NH—$CH_2$—$CH_2$—NH($C_2H_5$) groups, —NH—$CH_2$—$CH_2$—$CH_2$—NH ($C_2H_5$) groups, —NH—$CH_2$—$CH_2$—NH($CH_3$) groups, —NH—$CH_2$—$CH_2$—$CH_2$—NH($CH_3$) groups.

The reactive group or groups are attached to silicone compound (f) either directly or preferably via a spacer $A^2$. $A^2$ is selected from arylene, unsubstituted or substituted with one to four $C_1$-$C_4$-alkyl groups, alkylene and cycloalkylene such as for example 1,4-cyclohexylene. Preferred spacers $A^2$ are phenylene, in particular para-phenylene, also tolylene, in particular para-tolylene, and $C_2$-$C_{18}$-alkylene such as for example ethylene ($CH_2CH_2$), also —$(CH_2)_3$—, —$(CH_2)_4$—, —$(CH_2)_5$—, —$(CH_2)_6$—, —$(CH_2)_8$—, —$(CH_2)_{10}$—, —$(CH_2)_{12}$—, —$(CH_2)_{14}$—, —$(CH_2)_{16}$— and —$(CH_2)_{18}$—.

In addition to the reactive groups, silicone compound (f) comprises non-reactive groups, in particular di-$C_1$-$C_{10}$-alkyl-$SiO_2$ groups or phenyl-$C_1$-$C_{10}$-alkyl-$SiO_2$ groups, in particular dimethyl-$SiO_2$ groups, and if appropriate one or more $Si(CH_3)_2$—OH groups or $Si(CH_3)_3$ groups.

In an embodiment of the present invention, silicone compound (f) has on average one to four reactive groups per molecule.

In an advantageous embodiment of the present invention, silicone compound (f) has on average one to four COOH groups per molecule.

In another advantageous embodiment of the present invention, silicone compound (f) has on average one to four amino groups or aminoalkylamino groups per molecule.

Silicone compound (f) comprises Si—O—Si units in a chain-shaped or branched arrangement.

In an embodiment of the present invention, silicone compound (f) has a molecular weight $M_n$ in the range from 500 to 10 000 g/mol, preferably up to 5000 g/mol.

When silicone compound (f) has two or more reactive groups per molecule, these reactive groups can be attached—directly or via spacer $A^2$—to the Si—O—Si chain via two or more silicon atoms or pairwise via the same silicon atom.

The reactive group or groups may be attached to one or more of the terminal silicon atoms of silicone compound (f)—directly or via spacer $A^2$. In another embodiment of the present invention, the reactive group or groups are attached to one or more of the non-terminal silicon atoms of silicone compound (f)—directly or via spacer $A^2$.

In an embodiment of the present invention, aqueous polyurethane dispersion further comprises
a polydi-$C_1$-$C_4$-alkylsiloxane (g) having neither amino groups nor COOH groups, preferably a polydimethylsiloxane, herein also referred to in brief as polydialkylsiloxane (g) or polydimethylsiloxane (g).

The $C_1$-$C_4$-alkyl in polydialkylsiloxane (g) may be different or preferably the same and selected from methyl, ethyl, n-propyl, isopropyl, n-butyl, isobutyl, sec-butyl and tert-butyl, of which unbranched $C_1$-$C_4$-alkyl is preferred and methyl is particularly preferred.

Polydialkylsiloxane (g) and preferably polydimethylsiloxane (g) preferably comprises unbranched polysiloxanes having Si—O—Si chains or such polysiloxanes as have up to 3 and preferably not more than one branching per molecule.

Polydialkylsiloxane (D) and in particular polydimethylsiloxane (g) may have one or more $Si(C_1$-$C_4$-alkyl$)_2$-OH groups.

In an embodiment of the present invention, aqueous polyurethane dispersion comprises
altogether from 20% to 30% by weight of polyurethane (PU), or altogether from 20% to 30% by weight of polyurethanes (PU1) and (PU2),
from 1% to 10%, preferably 2% to 5% by weight of curative,
from 1% to 10% by weight of silicone compound (f),
from zero to 10%, preferably 0.5% to 5% by weight of polydialkylsiloxane (g).

In an embodiment of the present invention, aqueous polyurethane dispersion comprises
from 10% to 30% by weight of soft polyurethane (PU1) and from zero to 20% by weight of hard polyurethane (PU2).

In an embodiment of the present invention, aqueous dispersion of the present invention has a solids content of altogether 5% to 60% by weight, preferably 10% to 50% by weight and more preferably 25% to 45% by weight.

These weight % ages each apply to the active or solid ingredient and are based on the total aqueous dispersion of the present invention. The remainder ad 100% by weight is preferably continuous phase, for example water or a mixture of one or more organic solvents and water.

In an embodiment of the present invention, aqueous polyurethane dispersion comprises at least one additive (h) selected from pigments, antilusterants, light stabilizers, antistats, antisoil, anticreak, thickening agents, in particular thickening agents based on polyurethanes, and microballoons.

In an embodiment of the present invention, aqueous polyurethane dispersion comprises all together up to 20% by weight of additives (h).

Aqueous polyurethane dispersion may also comprise one or more organic solvents. Suitable organic solvents are for example alcohols such as ethanol or isopropanol and in particular glycols, diglycols, triglycols or tetraglycols and doubly or preferably singly $C_1$-$C_4$-alkyl etherified glycols, diglycols, triglycols or tetraglycols. Examples of suitable organic solvents are ethylene glycol, propylene glycol, butylene glycol, diethylene glycol, triethylene glycol, tetraethylene glycol, dipropylene glycol, 1,2-dimethoxyethane, methyltriethylene glycol ("methyltriglycol") and triethylene glycol n-butyl ether ("butyltriglycol").

Aqueous polyurethane dispersions can be produced by mixing polyurethane (PU), curative and silicone compound (f) with water and if appropriate one or more of the aforementioned organic solvents. If desired, polydialkylsiloxane (g) and additives (h) are also mixed in. The mixing can take the form of stirring for example. The order of addition of polyurethane (PU), curative, silicone compound (f) and water and if appropriate one or more of the aforementioned organic solvents and also—if desired—polydialkylsiloxane (g) and additives (h) is freely choosable.

It is preferable to proceed from a polyurethane (PU) dispersed in water or a mixture of water and organic solvent or from dispersed soft polyurethane (PU1) and hard polyurethane (PU2) and adding, preferably with stirring, curative and silicone compound (f) and also, if desired, polydialkylsiloxane (g) and if appropriate one or more organic solvents. Preferably, however, no organic solvent is added.

In an advantageous embodiment, thickening agent as an example of additive (h) is added last to thus adjust the viscosity of the aqueous polyurethane dispersion to the desired value.

After polyurethane layer (C) has cured, it is separated from the mold, for example by peeling off, to obtain a polyurethane film (C) which forms the polyurethane layer (C) in multilayered composite material of the present invention.

In a further operation of the inventive production process, preferably organic adhesive is applied to polyurethane film (C) or to cellulosic material (A), non-uniformly, for example in the form of points, dots or stripes. In one version of the present invention, one preferably organic adhesive is applied to polyurethane film (C) and one preferably organic adhesive is applied to cellulosic material (A), the two adhesives differing, for example by virtue of one or more additives or because they comprise chemically different preferably organic adhesives. Thereafter, polyurethane film (C) and cellulosic material (A) are bonded together, such that the layer(s) of adhesive come to reside between the polyurethane film (C) and cellulosic material (A). The adhesive or adhesives are cured, for example thermally, by means of actinic radiation or by aging, to obtain multilayered composite material of the present invention.

In an embodiment of the present invention, an interlayer (D) is placed between cellulosic material (A) and bonding layer (B), between bonding layer (B) and polyurethane layer (C) or between two bonding layers (B).

The interlayer (D) is as defined above.

The placing can be done manually or mechanically, continuously or batchwise.

The present invention further provides for the use of multilayered composite materials of the present invention for producing seats. Seats are for example seats for means of transport such as boats, automobiles, airplanes, railroad vehicles, street cars, buses and, in particular, child seats. The present invention further provides a process for producing seats by using multilayered composite materials of the present invention.

The present invention further provides seats comprising a multilayered composite material of the present invention. Only little perspiration collects on surfaces of seats according to the present invention; moisture and also other liquids/fluids are absorbed.

The present invention also provides for the use of multilayered composite materials of the present invention in the interiors of vehicles, for example in dashboards, roof liners, interior trim and center consoles. Multilayered composite materials of the present invention have a very pleasant hand as well as an appealing visual appearance, and can have a thermally and/or acoustically insulating effect. The present invention further provides vehicles containing at least one multilayered composite material of the present invention in the interior.

A further use for multilayered composite materials of the present invention is in the production of furniture, for example sofas, furniture for lying on such as loungers, armchairs and chairs. A further use for composite materials of the present invention is as or for the production of elements for the interiors of buildings.

The present invention further provides for the use of multilayered composite materials of the present invention as or in the manufacture of packaging materials, for example cartons, chests, boxes, covers, packaging papers or wrappers. The packaging materials may also serve decorative purposes to some extent or predominantly. The present invention further provides packaging materials consisting of or obtained by using multilayered composite materials of the present invention. The present invention further provides for the use of multilayered composite materials of the present invention as or in the manufacture of decorative materials. The present invention further provides decorative materials consisting of or obtained by using multilayered composite materials of the present invention. Examples are garlands and laminations.

The present invention further provides for the use of multilayered composite materials of the present invention in the manufacture of costly printed products such as brochures, prospectuses, catalogs, in particular annual reports and books, for example book covers.

Working examples further elucidate the present invention.
I. Production of Starting Materials
I.1 Production of an Aqueous Polyurethane Dispersion Disp.1

The following were mixed in a stirred vessel:
7% by weight of an aqueous dispersion (particle diameter: 125 nm, solids content: 40%) of a soft polyurethane (PU1.1) prepared from hexamethylene diisocyanate (a1.1) and isophorone diisocyanate (a1.2) in a weight ratio of 13:10 as diisocyanates and as diols, a polyester diol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2) and also 3% by weight of monomethylated polyethylene glycol (c.1) and also 3% by weight of H2N—CH2CH2—NH—CH2CH2—COOH, % by weight all based on polyester diol (b1.1), softening point of soft polyurethane (PU1.1): 62° C., softening starts at 55° C., Shore A hardness 54, 65% by weight of an aqueous dispersion (particle diameter: 150 nm) of a hard polyurethane (PU2.2), obtainable by reaction of isophorone diisocyanate (a1.2), 1,4-butanediol, 1,1-dimethylolpropionic acid, hydrazine hydrate and polypropylene glycol having a molecular weight $M_w$ of 4200 g/mol, softening point of 195° C., Shore A hardness 86, 3.5% by weight of a 70% by weight solution (in propylene carbonate) of compound (V.1),

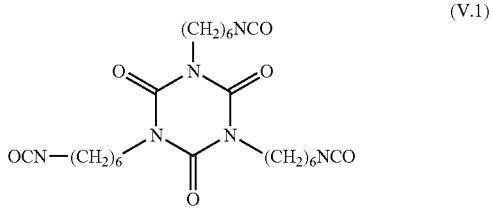

6% by weight of a 65% by weight aqueous dispersion of the silicone compound according to Example 2 of EP-A 0 738 747 (f.1)

2% by weight of carbon black, 0.5% by weight of a thickening agent based on polyurethane, 1% by weight of microballoons of polyvinylidene chloride, filled with isobutane, diameter 20 μm, commercially obtainable for example as Expancel® from Akzo Nobel.

This gave an aqueous dispersion Disp.1 having a solids content of 35% and a kinematic viscosity of 25 seconds at 23° C., determined in accordance with DIN EN ISO 2431, as of May 1996.

1.2 Production of an Aqueous Formulation Disp.2

The following were mixed in a stirred vessel:

7% by weight of an aqueous dispersion (particle diameter: 125 nm, solids content: 40%) of a soft polyurethane (PU1.1) prepared from hexamethylene diisocyanate (a1.1) and isophorone diisocyanate (a1.2) in a weight ratio of 13:10 as diisocyanates and as diols, a polyester diol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2), 3% by weight of monomethylated polyethylene glycol (c.1) and also 3% by weight of H2N—CH2CH2—NH—CH2CH2—COOH, % by weight all based on polyester diol (b1.1), softening point of 62° C., softening starts at 55° C., Shore A hardness 54, 65% by weight of an aqueous dispersion (particle diameter: 150 nm) of a hard polyurethane (α2.2), obtainable by reaction of isophorone diisocyanate (a1.2), 1,4-butanediol (PU1.2), 1,1-dimethylolpropionic acid, hydrazine hydrate and polypropylene glycol having a molecular weight $M_w$ of 4200 g/mol (b1.3), polyurethane (PU2.2) had a softening point of 195° C., Shore A hardness 90, 3.5% by weight of a 70% by weight solution (in propylene carbonate) of compound (V.1), NCO content 12%, 2% by weight of carbon black.

This gave a polyurethane dispersion Disp.2 having a solids content of 35% and a kinematic viscosity of 25 seconds at 23° C., determined in accordance with DIN EN ISO 2431, as of May 1996.

II. Production of a Mold

A liquid silicone was poured onto a surface having the pattern of full grain calf leather. The silicone was cured by adding a solution of di-n-butylbis(1-oxoneodecyloxy)-stannane as 25% by weight solution in tetraethoxysilane as an acidic curative to obtain a silicone rubber layer 2 mm in thickness on average, which served as the mold. The mold was adhered onto a 1.5 mm thick aluminum support.

III. Application of Aqueous Polyurethane Dispersions onto Mold from II.

The mold from II. was placed on a heatable surface and heated to 91° C. Disp.1 was then sprayed onto it through a spray nozzle, at 88 g/m² (wet). No air was admixed during application, which was done with a spray nozzle having a diameter of 0.46 mm, at a pressure of 65 bar. This was followed by solidification at 91° C. until the surface was no longer tacky.

The spray nozzle was located 20 cm above the surface passing underneath it, and could be moved in the transport direction of the surface, and moved transversely to the transport direction of the surface. The surface took about 14 seconds to pass the spray nozzle and had a temperature of 59° C. After being exposed for about two minutes to a stream of dry hot air at 85° C., the polyurethane film (C.1) thus produced, which had a netlike appearance, was almost water-free.

In an analogous arrangement, Disp.2 was immediately thereafter applied to the mold thus coated, as bonding layer (B.1) at 50 g/m² wet, and subsequently allowed to dry.

This gave a mold coated with polyurethane film (C.1) and bonding layer (B.1).

Paperboard (A.1) having a basis weight of 210 g/m² was sprayed with disp. 2 at 30 g/m² (wet). The surface of paperboard (A.1) appeared dry after just a few seconds.

IV. Production of an Inventive Multilayered Composite Material

Thereafter, cardboard (A.1) was placed with the sprayed side onto the still hot bonding layer (B.1) which was on the mold together with polyurethane film (C.1), and was compressed in a press at 4 bar and 110° C. for 15 seconds. The inventive multilayered composite material MSV.1 thus obtained was subsequently removed from the press and the mold was removed from it.

The inventive multilayered composite material MSV.1 thus obtained was notable for pleasant haptics, an appearance which was identical to a leather surface, and also breathability: In addition, the inventive multilayered composite material MSV.1 was easy to clean of contaminants such as for example dust. Air could be blown through MSV.1.

The invention claimed is:

1. A multilayered composite material, comprising:
(A) a layer of cellulosic material;
(B) optionally at least one bonding layer; and
(C) a polyurethane layer with capillaries passing through the entire thickness of the polyurethane layer,
wherein:
an average thickness of polyurethane layer (C) ranges from 15 to 300 μm;
the polyurethane layer (C) is patterned with a patterning selected from the group consisting of a leather appearance, a wood appearance and a velvet appearance; and the polyurethane layer (C) is in the form of a polyurethane film.

2. The multilayered composite material according to claim 1, wherein the cellulosic material (A) is selected from the group consisting of a paper, a paperboard, a wood, a chipboard and a wood plastic composite.

3. The multilayered composite material according to claim 1, comprising a bonding layer (B) comprising a layer of a cured organic adhesive.

4. The multilayered composite material according to claim 1, wherein said polyurethane layer (C) has a velvet appearance.

5. The multilayered composite material according to claim 1, comprising a bonding layer (B) comprising an interrupted layer of a cured organic adhesive.

6. The multilayered composite material according to claim 1, comprising a bonding layer (B) and further comprising at least one interlayer (D) disposed:
   between the layer of the cellulosic material (A) and the bonding layer (B);
   between the bonding layer (B) and the polyurethane layer (C); or
   between two bonding layers (B),
   wherein the interlayer (D) is selected from the group consisting of a textile, a batt material, a leather and an open-cell foam.

7. The multilayered composite material according to claim 6, wherein the interlayer (D) comprises a nonwoven thermoplastic polyurethane.

8. The multilayered composite material according to claim 1, wherein the polyurethane layer (C) includes the capillaries in an average amount of at least 100 capillaries per 100 $cm^2$.

9. The multilayered composite material according to claim 1, wherein the polyurethane layer (C) includes the capillaries in an average amount of at least 250 capillaries per 100 $cm^2$.

10. The multilayered composite material according to claim 1, wherein the capillaries of the polyurethane layer (C) have an average diameter ranging from 0.005 to 0.05 mm.

11. The multilayered composite material according to claim 1, wherein the capillaries of the polyurethane layer (C) have an average diameter ranging from 0.009 to 0.03 mm.

12. The multilayered composite material according to claim 1, wherein the capillaries of the polyurethane layer (C) are nonuniformly distributed over the polyurethane layer (C).

13. The multilayered composite material according to claim 1, wherein the capillaries of the polyurethane layer (C) are arcuate.

14. The multilayered composite material according to claim 1, wherein the capillaries of the polyurethane layer (C) have an straight line course.

15. The multilayered composite material according to claim 1, wherein the polyurethane layer (C) has a water vapor permeability above 1.5 mg/$cm^2$·h, as measured according to German standard specification DIN 53333.

16. The multilayered composite material according to claim 1, wherein the polyurethane layer (C) additionally has pores which do not extend through the entire thickness thereof.

17. The multilayered composite material according to claim 1, wherein the polyurethane layer (C) comprises hairs having an average length ranging from 20 to 500 μm.

18. The multilayered composite material according to claim 17, wherein the hairs have an average spacing of 50 to 350 μm from one hair to the next.

19. The multilayered composite material according to claim h wherein the polyurethane layer (C) comprises hairs having an average spacing of 50 to 350 μm from one hair to the next.

20. The multilayered composite material according to claim 1, wherein the polyurethane film is formed by applying a polyurethane dispersion to a preheated mold which is patterned, and allowing water in the polyurethane dispersion to evaporate, to form the polyurethane film which is patterned.

21. A packaging material, comprising the multilayered composite material of claim 1.

22. A decorative material, comprising the multilayered composite material of claim 1.

23. A process for producing the multilayered composite material of claim 1, the process comprising:
   forming a polyurethane layer (C) with the aid of a mold;
   applying at least one organic adhesive uniformly or partially onto the layer of cellulosic material (A) the polyurethane layer (C), or both; and then
   bonding the polyurethane layer (C) pointwise, stripwise or areawise to the layer of cellulosic material (A).

24. The process according to claim 23, wherein the polyurethane layer (C) is formed with the aid of a silicone mold.

25. The process according to claim 24, wherein the silicone mold comprises a silicone mold structured with the aid of laser engraving.

26. The process according to claim 23, wherein the mold is structured with a laser to cut wells into the mold which have:
   an average depth ranging from 50 to 250 μm; and
   a center-to-center spacing ranging from 50 to 250 μm.

27. The process according to claim 23, further comprising placing an interlayer (D):
   between the layer of cellulosic material (A) and the bonding layer (B);
   between the bonding layer (B) and the polyurethane layer (C); or
   between two bonding layers (B).

* * * * *